United States Patent [19]
Dey et al.

[11] Patent Number: 5,146,072
[45] Date of Patent: Sep. 8, 1992

[54] METHOD FOR DETERMINING LARGE PETAL PISTON IN A SEGMENTED IMAGING ASSEMBLY

[75] Inventors: Thomas W. Dey, Springwater; Alan L. Wertheimer, Pittsford, both of N.Y.

[73] Assignee: Eastman Kodak Company, Rochester, N.Y.

[21] Appl. No.: 661,781

[22] Filed: Feb. 26, 1991

[51] Int. Cl.$^5$ .............................................. G01J 1/20
[52] U.S. Cl. .................................. 250/201.9; 356/121
[58] Field of Search ................. 250/201.9, 237 R; 356/121

[56] References Cited

U.S. PATENT DOCUMENTS 4,405,232  9/1983  Mansell ............................. 356/121
5,049,734  9/1991  Marino ............................ 250/201.9

Primary Examiner—David C. Nelms
Attorney, Agent, or Firm—Stephen C. Kaufman

[57] ABSTRACT

A method suitable for determining large petal piston in a segmented imaging assembly. The assembly preferably comprises a polychromatic source of radiation that can output a polychromatic radiation beam; and, a segmented imaging system including petals comprising a reference component and a test component, which components can be used to form an imaged radiation beam. The method steps comprise intercepting preselected portions of the imaged radiation beam with a mask comprising two apertures, so that one aperture is dedicated to radiation imaged by the reference component, and the second aperture is dedicated to radiation imaged by the test component, thereby creating a real time masked image; and, interrogating an envelope and a fine structure spacing of the real time masked image, as a measure of the large petal piston of the segmented imaging system.

5 Claims, 7 Drawing Sheets

SECTION A-A

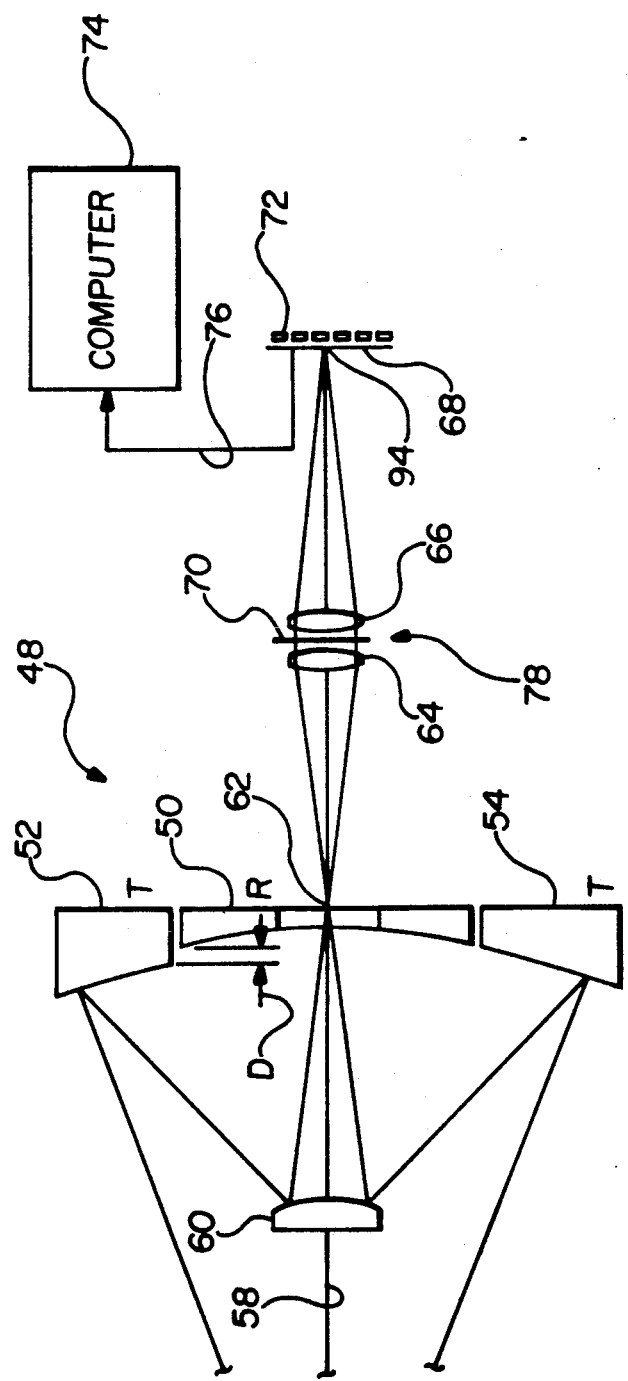
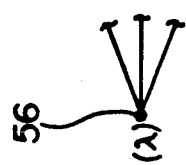
FIG. 5

METHOD FOR DETERMINING LARGE PETAL PISTON IN A SEGMENTED IMAGING ASSEMBLY

CROSS-REFERENCE TO A RELATED APPLICATION

This application is related to a U.S. patent application Ser. No. 07/621,400 filed Nov. 30, 1990, now U.S. Pat. No. 5,124,542 by A. Wertheimer. The entire disclosure of this application is incorporated by reference herein. This application is copending and commonly assigned.

FIELD OF THE INVENTION

This invention relates to a method for determining large petal piston in a segmented imaging assembly.

INTRODUCTION TO THE INVENTION

We are working on segmented imaging assemblies, in particular, segmented optical imaging assemblies.

One example of a segmented optical imaging assembly is shown in FIG. 1. The FIG. 1 segmented optical imaging assembly 10 (hereinafter, assembly 10) comprises a system including a center mirror segment 12, and a set of six mirror segments, or petals (numerals 14–24). The petals (14–24) circumscribe the center mirror segment 12. The assembly 10 may be employed to accept source radiation, for example, broadband or polychromatic light, and collectively re-image the input source radiation at a unique focal point.

A second example of a segmented imaging assembly is shown in FIGS. 2A, B, comprising cross-sectional and top views, respectively. A FIG. 2 segmented optic 26 comprises a portion of an advanced X-ray astronomical telescope. In particular, the segmented optic 26 comprises a set of parabolically shaped, cylindrically nested, physically de-coupled, discrete mirror segments 28, 30, 32. The mirror segments (28–32), or petals, can cooperate to function as a grazing incident reflecting optical assembly.

The optical segmented imaging assemblies illustrated in FIGS. 1 and 2 are particular examples of segmented imaging assemblies. In general, and for purposes of the present invention, a segmented imaging assembly may be defined as an imaging assembly comprising at least two or more physically separate parts, e.g., petals, designed to act in an imaging function as a single, larger monolithic component.

It is indicated above that the present invention relates to a method for determining large petal piston, in a segmented imaging assembly of the type just defined. The concept and a problem of petal piston are now explained, with continued reference, for purposes of pedagogy, to the FIG. 1 segmented optical imaging assembly 10, as well as reference to a FIG. 3.

In particular, attention is now directed to FIG. 3, which shows a partial edge-view 34 of the FIG. 1 assembly 10. FIG. 3 shows the center mirror 12, the adjacent petals 14 and 20, an assembly optical axis 36, and a focal point 38 located on the assembly optical axis 36.

Now, it may be observed that the center mirror 12 and petal 20 define a continuous surface curvature, so that incoming radiation to the assembly 10, represented by rays of light 40, 42, and 44, may be uniquely returned to the focal point 38, by the tandem operation of the center mirror segment 12 and the petal 20. Thus, the source radiation from the segments 12 and 20 may be considered to be "in phase" with respect to the focal point 38. For this situation, one can say that there is no petal piston between the center mirror 12 and adjacent petal 20.

For the situation of the FIG. 3 petal 14, however, there is petal piston. Petal piston has been induced by way of the parallel, translational displacement D of the petal segment 14, relative to the center 12. The displacement D is such that the center mirror segment 12 and the petal 14 no longer define a continuous surface curvature, but rather effect an abrupt curvature singularity. In effect, this displacement D, which is the petal piston, induces an optical path difference (OPD) or phase retardation, between radiation wavefronts returned to the focal point 38 by the disparate segments 12, 14.

(Note in FIG. 3 that there is also a small shift of the location of the focused radiation represented by a ray 46. However, when piston D, which may be either positive or negative, is on the order of the wavelength of the radiation, and the dimension of the imaging aperture 34 is much greater than the wavelength of the radiation, the dominant effect is due to an electromagnetic interference between the beams of radiation from the various segments.)

The petal piston D between segments 12 and 14 can result in a significant degradation of image quality everywhere in the region of the focal point 38, unless the petal piston D is eliminated, or at least reduced to a value very much less than one half of the wavelength of the radiation.

SUMMARY OF THE INVENTION

The problem of petal piston (D) in a segmented imaging assembly is addressed in Wertheimer's U.S. patent application Ser. No. 7/621,400, referenced above. Wertheimer discloses a method for quantitatively determining petal piston in a segmented imaging system, and, in particular, solves the problem for those cases where one must make high precision, low noise measurements of axial position error D, or piston.

We have now discovered a novel method for quantitatively determining petal piston in a segmented imaging assembly, which novel method complements the Wertheimer method—in the following sense.

As just indicated, Wertheimer's method is advantageously employed for high precision, fine alignment applications, where the petal piston D is typically much less than one half wave OPD. Co-existing with the application of the Wertheimer method, however, there may potentially remain an immanent, independent problem, which we now identify as a "coarse alignment" or large petal piston problem, and which we hereby solve.

The coarse alignment or large petal piston problem that we identify may be heuristically explained by way of FIG. 4. FIG. 4 shows a coarse alignment petal piston sinusoidal curve that subsumes a potentially infinite series of X fine alignment windows (where X=5 in FIG. 4). Now, for each of the 5 fine alignment windows, the Wertheimer method can precisely determine petal piston D, where D is typically less than one-half wave OPD.

FIG. 4 also demonstrates that the fine alignment windows repeat at $2\pi DX$ intervals, so that in aggregation, the X windows define a coarse alignment envelope that can extend over many waves, e.g., 10 or 20 or more waves OPD. (Attention may be usefully redirected to FIG. 3, which shows how the petal 14 may be displaced at repeated intervals $2\pi DX$, thus "generating" the FIG. 4 sinusoid).

With respect to FIG. 4, the immanent and independent problem of Wertheimer, alluded to above, may therefore be stated as follows: Given a Wertheimer fine alignment solution, which may be "true" for any of the X windows, how can one unambiguously and uniquely signify a particular window x, subsumed by the $2\pi DX$ coarse alignment envelope, which particular window x corresponds to an actual and arbitrary large petal displacement D?

We have now discovered a novel method which addresses this overlapping problem of fine and coarse alignment, and provides a solution so that a potential "$2\pi DX$ ambiguity" embedded in a fine alignment solution, may be eliminated. An important advantage of the novel method is that its implementation complements the Wertheimer fine alignment method, thereby providing a complete solution for quantitatively determining petal piston in a segmented imaging system.

The novel method is particularly suitable for determining piston in a segmented imaging assembly, the assembly comprising (a) a polychromatic source of radiation that can output a polychromatic radiation beam; and (b) a segmented imaging system comprising a reference component and a test component, which components can be used to form an imaged radiation beam;

the steps of the method of the present invention comprising:

1) intercepting preselected portions of the imaged radiation beam with a mask comprising two apertures, so that one aperture is dedicated to radiation imaged by the reference component, and the second aperture is dedicated to radiation imaged by the test component, thereby creating a real time masked image; and 2) interrogating an envelope and a fine structure spacing of the real time masked image, as a measure of the large petal piston of the segmented imaging system.

BRIEF DESCRIPTION OF THE DRAWING

The invention is illustrated in the accompanying drawing, in which:

FIG. 5 shows a segmented optical imaging assembly used to demonstrate the steps of the present invention;

DETAILED DESCRIPTION OF THE INVENTION

Figure 1:
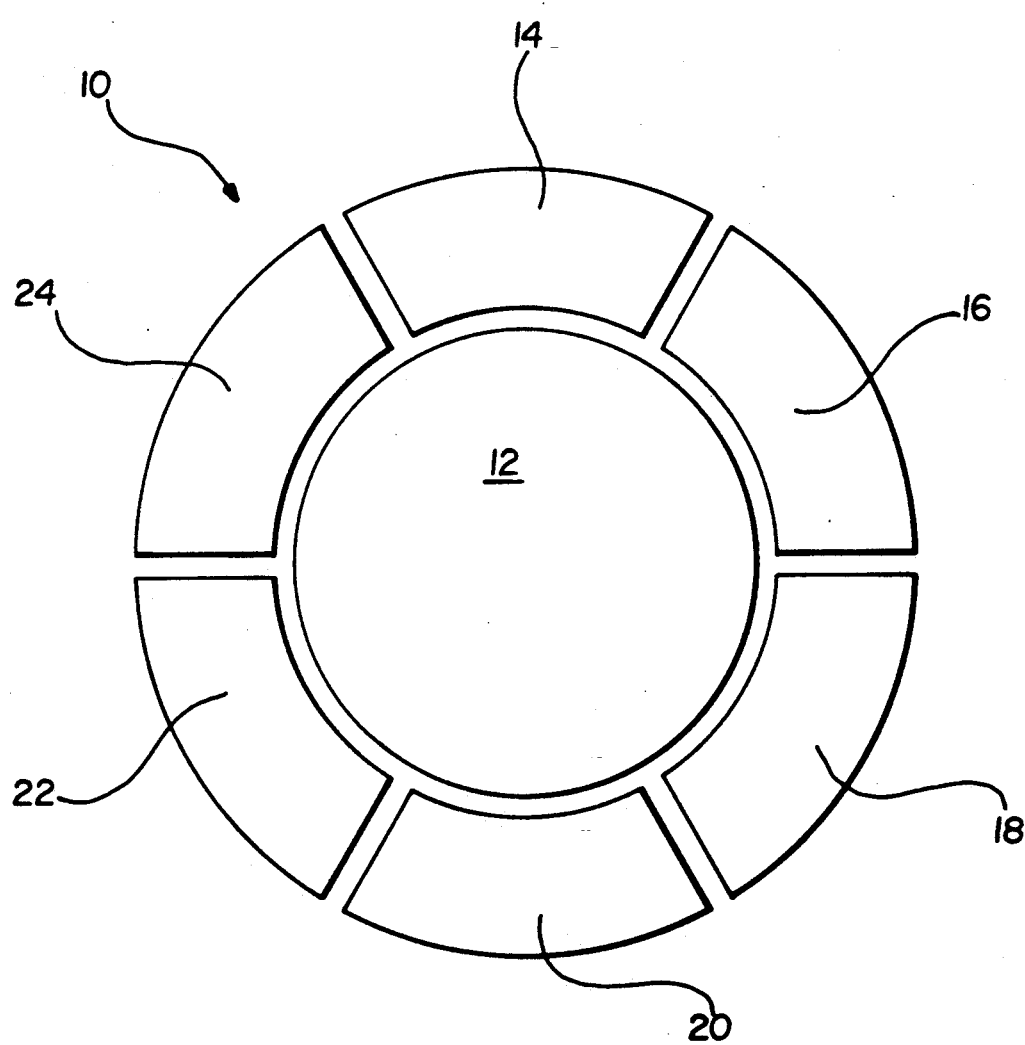
FIG. 1 shows a first example of a segmented optical imaging assembly.
Figure 2A:
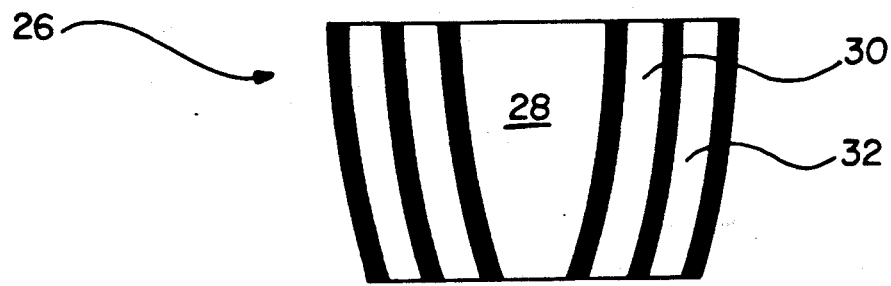
FIGS. 2A, 2B show a second example of a segmented optical imaging assembly.
Figure 2B:
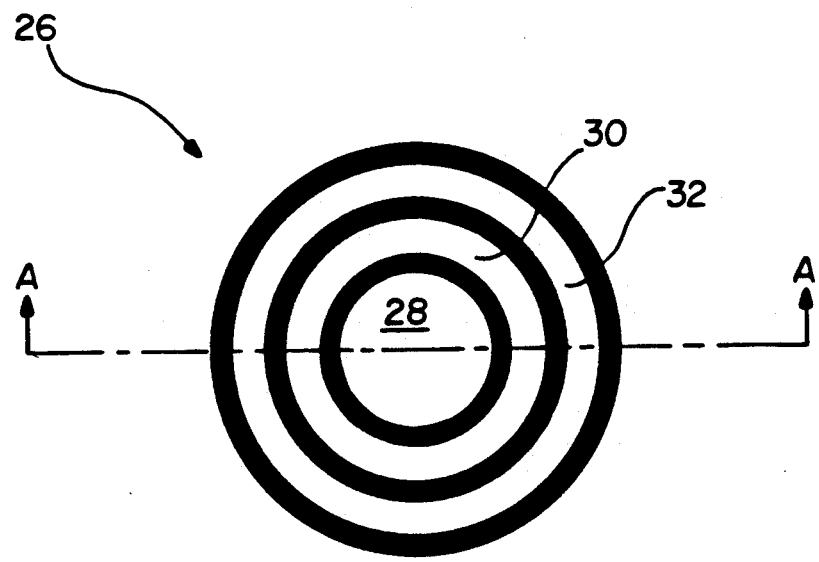
Figure 3:
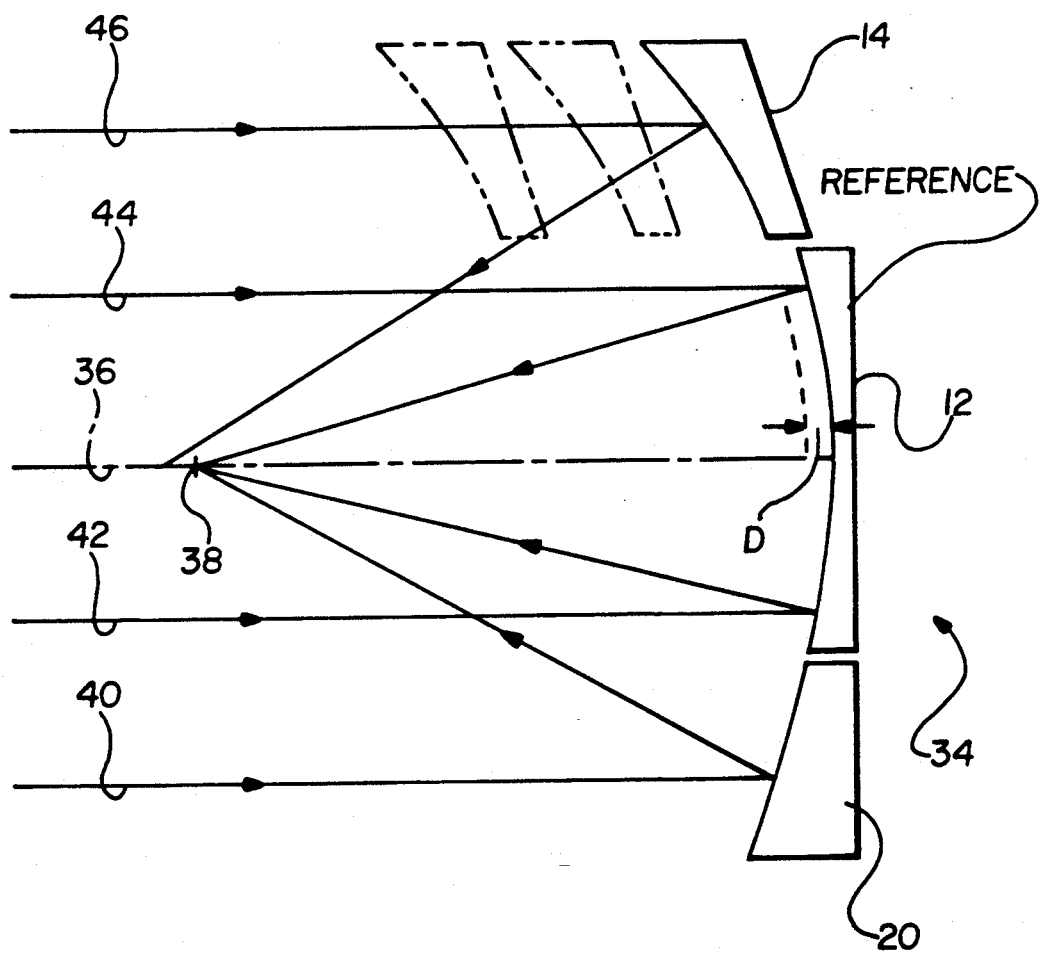
FIG. 3 shows a partial edge-view of the FIG. 1 segmented optical imaging assembly.
Figure 4:
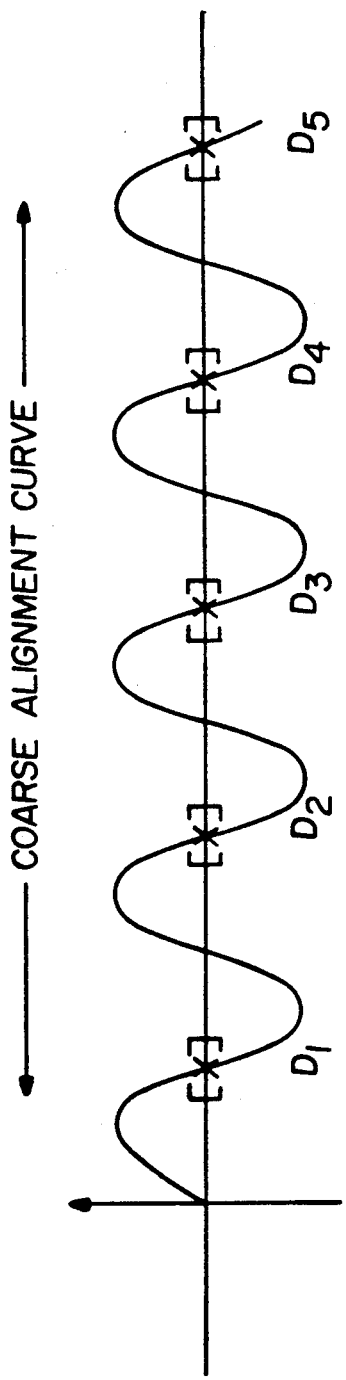
FIG. 4 shows a petal piston sinusoidal curve used to demonstrate a problem the method of the present invention can solve.

As summarized above, the method of the present invention is suitable for determining large petal piston in a segmented imaging assembly. Breaking down the phrase, "segmented imaging assembly", note that the term "segmented" imaging assembly has been generally defined, above. Note, furthermore, that the term "imaging" assembly is one that is capable of imaging radiation over a large portion of the electromagnetic spectrum, including, for example, the microwave, radiowave, or optical portions.

The method of the present invention is preferably demonstrated by reference to a segmented optical assembly, of the type shown in FIG. 5 as numeral 48.

The FIG. 5 optical assembly 48 comprises a segmented imaging system comprising a conventional mirror reference component 50, and arbitrarily spaced-apart conventional mirror test components 52 and 54. The mirror reference component 50 and the mirror test components 52, 54 are physically de-coupled imaging components, designed to act in an imaging function as a single, larger monolithic component. It is an objective of the method of the present invention, as disclosed in detail below, to provide a quantitative determination of a real time mirror test component piston of either component 52, 54, with respect to the mirror reference component 50.

Continuing, the FIG. 5 optical assembly 48 further includes a conventional polychromatic source ($\lambda$) of radiation 56, that can output a polychromatic radiation beam along an assembly optical axis 58.

The FIG. 5 optical assembly 48 also includes a secondary mirror 60 that can function to form an image of the source 56 at a location 62, so that, in turn, this image may be relayed by a set of conventional lenses 64, 66 to a source conjugate image plane 68. Note, further, that the location of the optics 60, 64, in turn, defines a location of a pupil conjugate image plane 70, that is the image of the system 50, 52, 54.

The image at the source conjugate image plane 68 is coincident with a conventional CCD photodetector 72. The CCD photodetector 72 can detect an image photon intensity distribution. A subsequent evaluation of point spread functions (PSF) corresponding to a photon intensity distribution, may be effected by way of a conventional computer 74, connected to the CCD photodetector 72, along a line 76.

As alluded to above, it is an objective of the method of the present invention to provide a quantitative determination of a real time test component 52 piston displacement D, with respect to the reference component 50. This can be done in accordance with the two method steps summarized above, and now detailed.

Step 1: Intercepting Preselected Portions of the Imaged Radiation Beam with a Mask Step 1 of the present method requires intercepting a preselected portion of an imaged radiation beam (formed by the test component 52 and the reference component 50), with a mask.

Figure 6A:
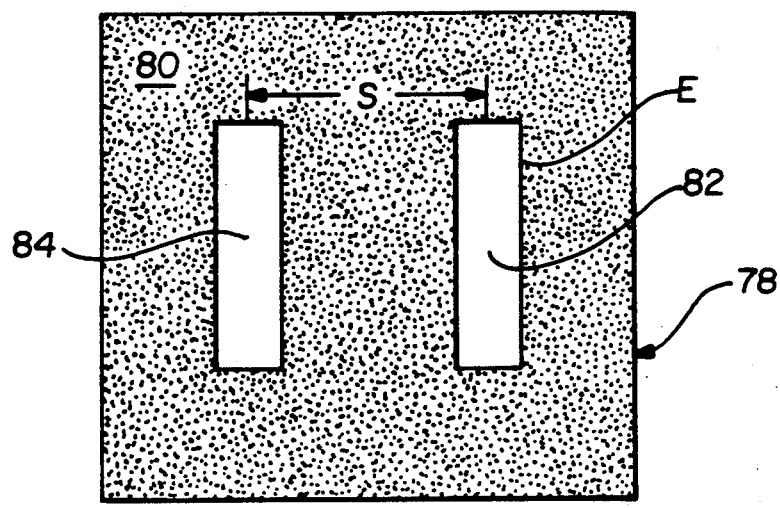
FIGS. 6A-B show masks that can be used in the steps of the present invention.
Figure 6B:
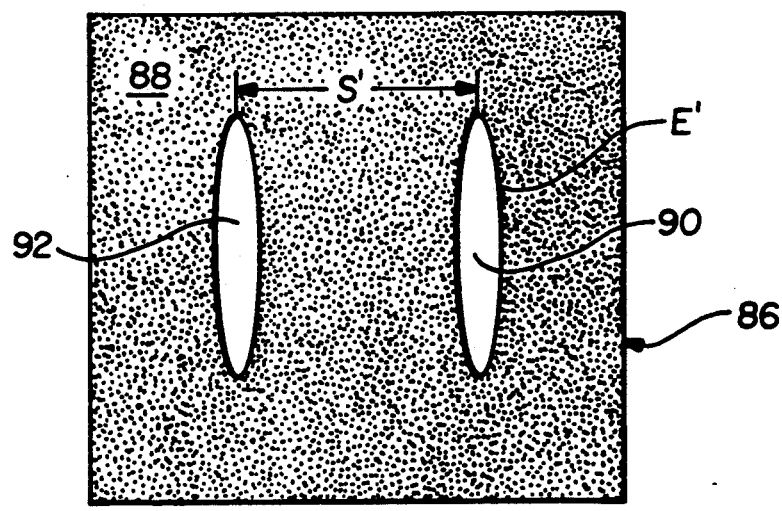

FIG. 6 shows preferred masks of the present invention. In particular, FIG. 6A shows a mask 78 comprising an opaque screen 80 and defining two apertures 82, 84. The apertures 82, 84 each have a preferred rectangular shape E, and are separated by a distance S. FIG. 6B shows a mask 86 comprising an opaque screen 88 and defining two slit apertures 90, 92. The apertures 90, 92 each have an oval shape E' (in contrast to FIG. 6A) and are separated by a distance S'. The significance of the geometric shapes and geometric relationships (E,S) will be set out more fully below, where it is shown how these geometrics can empirically relate to a quantitative determination of large petal piston D.

For the sake of example, the FIG. 6A mask 78 may be chosen for incorporation into the FIG. 5 optical assembly 48, and preferably positioned at a normal to the FIG. 5 optical axis 58, and coincident with the pupil conjugate image plane 70. In this way, the mask 78 can function so that the first aperture 82 can be dedicated to radiation imaged by the reference component 50, and the second aperture 84 can be dedicated to radiation imaged by the test component 52. This action creates a real time masked image 94. The real time masked image 94, in turn, can impinge on the CCD photodetector 72, thus setting the stage for step 2.

Step 2: Interrogating an Envelope and a Fine Structure Spacing of the Real Time Masked Image, as a Measure of the Large Petal Piston of the Segmented Imaging System Step 1, in summary, can generate a real time masked image 94. The real time masked image 94, in turn, can impinge on the FIG. 5 CCD photodetector 72. As subsequently effected by the computer 76, one can plot the CCD photodetector 72 intensity (I) as a function of its spatial positioning (x), as shown in FIG. 7, to thus generate a coarse alignment or large petal piston curve 96.

Figure 7:
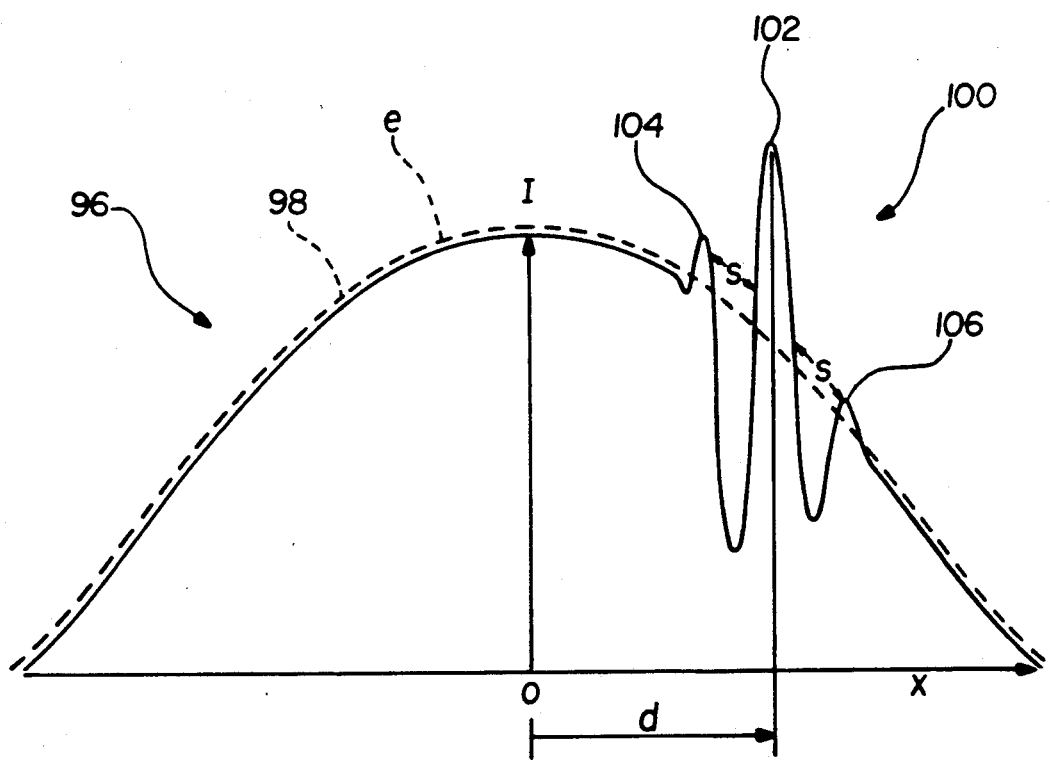
FIG. 7 shows a point spread function generated in accordance with the first and second steps of the present invention.

Restated, the FIG. 7 coarse alignment curve 96 shows intensity I as a function of spatial position x, for the case where the two slit mask 78 intercepts a radiation beam imaged by the displaced (D) test and reference components 52, 50.

The FIG. 7 coarse alignment curve 96, in detail, comprises a broad envelope function e (98) and a highly modulated region 100. The highly modulated region 100 comprises a unique and intense central singularity or spike 102, flanked by two spaced-apart (s) lesser spikes 104, 106. The form of the envelope function e (98) is a known characteristic, determined by a known Fourier transform of the geometric shape (E) of the mask aperture. The spacing s of the spikes (102, 104, 106) from each other is a known characteristic, determined by the known geometric spacing (S) of the mask apertures.

FIG. 7 also denotes a distance parameter d, defined along the x axis from an origin or photometric centroid (o) to the intense central spike 102. This distance parameter d is a direct quantitative measure of the sought-for large petal piston (D) of the reference component 50 with respect to the test component 52. This unique relationship is given by the following equation:

$$D = \frac{ds}{2Mf},$$

where: f is a focal length of the FIG. 5 collection optic assembly comprising the components 50, 52, 54 and 60, and M is a magnification of the FIG. 5 relay optic assembly comprising lenses 64 and 66.

We claim:
1. A method suitable for determining piston in a segmented imaging assembly, the assembly comprising
   (a) a polychromatic source of radiation that can output a polychromatic radiation beam; and
   (b) a segmented imaging system comprising a reference component and a test component, which components can be used to form an imaged radiation beam;

the steps of the method comprising:
   1) intercepting preselected portions of the imaged radiation beam with a mask comprising two apertures, so that one aperture is dedicated to radiation imaged by the reference component, and the second aperture is dedicated to radiation imaged by the test component, thereby creating a real time masked image; and
   2) interrogating an envelope and a fine structure spacing of the real time masked image, as a measure of a large amount of petal piston of the test component relative to the reference component of the segmented imaging system.

2. A method according to claim 1, wherein step 1 comprises positioning the mask with respect to the assembly so that it is positioned at a normal to an assembly imaging axis and optically conjugate to a pupil plane containing the reference and test components.

3. A method according to claim 1, wherein step 1 comprises impinging the real time masked image on a CCD photodetector, for sensing and converting the real time masked image as a coarse alignment function of intensity and position.

4. A method according to claim 3, wherein the coarse alignment function defines a photometric centroid of the real time masked image.

5. A method according to claim 3, comprising interrogating the coarse alignment function for locating a unique singularity, which location is a direct quantitative measure of the large amount of petal piston of the segmented imaging system.

* * * * *